United States Patent
Beckmann et al.

(10) Patent No.: US 7,416,798 B2
(45) Date of Patent: Aug. 26, 2008

(54) APPARATUS AND METHODS FOR GENERATING WATER IN A FUEL CELL SYSTEM

(75) Inventors: Gerhard Beckmann, Altamont, NY (US); Paul F. Mutolo, Albany, NY (US); William W. Dailey, Loudonville, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 337 days.

(21) Appl. No.: 10/091,821

(22) Filed: Mar. 6, 2002

(65) Prior Publication Data
US 2003/0170508 A1    Sep. 11, 2003

(51) Int. Cl.
    *H01M 8/00* (2006.01)
(52) U.S. Cl. .............................. 429/13; 429/19; 429/29
(58) Field of Classification Search .................. 429/13, 429/22, 29, 19
    See application file for complete search history.

(56) References Cited

U.S. PATENT DOCUMENTS

| | | | |
|---|---|---|---|
| 4,673,624 A | 6/1987 | Hockaday | |
| 4,810,597 A | 3/1989 | Kumagai et al. | |
| 5,523,177 A | 6/1996 | Kosek et al. | |
| 5,573,866 A | 11/1996 | Van Dine et al. | |
| 5,599,638 A | 2/1997 | Surampudi et al. | |
| 5,629,104 A * | 5/1997 | Crawford et al. ............... 429/34 |
| 5,631,099 A | 5/1997 | Hockaday | |
| 5,723,228 A | 3/1998 | Okamoto | |
| 5,759,712 A | 6/1998 | Hockaday | |
| 5,766,786 A | 6/1998 | Fleck et al. | |
| 5,773,162 A | 6/1998 | Surampudi et al. | |
| 5,795,668 A | 8/1998 | Banerjee | |
| 5,916,699 A | 6/1999 | Thomas et al. | |
| 5,945,231 A | 8/1999 | Narayanan et al. | |
| 5,992,008 A | 11/1999 | Kindler | |
| 6,210,820 B1 * | 4/2001 | Knights et al. ................. 429/13 |
| 6,383,670 B1 | 5/2002 | Edlund et al. | |
| 6,410,175 B1 * | 6/2002 | Tillmetz et al. ............... 429/13 |
| 6,458,477 B1 * | 10/2002 | Hsu ............................ 429/17 |

(Continued)

FOREIGN PATENT DOCUMENTS

JP       356114284 A  *  2/1980  ................... 429/39

(Continued)

OTHER PUBLICATIONS

JPO English Abstract for JP 56-114284 A (publication date of Sep. 1981).*

(Continued)

*Primary Examiner*—Patrick Ryan
*Assistant Examiner*—Ben Lewis
(74) *Attorney, Agent, or Firm*—Cesari and McKenna LLP

(57) ABSTRACT

Apparatus and methods for the generation of water in a direct oxidation fuel cell. Water, in addition to carbon dioxide and heat, is produced when carbonaceous fuel or fuel solution is oxidized in the presence of air and a suitable catalyst. This oxidation reaction is performed on a surface that allows for the introduction of oxygen in the presence of a catalyst. Water produced can then be directly added to the fuel solution thereby diluting the fuel solution to a desired concentration, or may be separately and then later added to fuel solution for the normal fuel cell operations depending on the permeability of the membrane to water.

2 Claims, 8 Drawing Sheets

U.S. PATENT DOCUMENTS

| | | | |
|---|---|---|---|
| 6,475,652 B2 * | 11/2002 | Grasso et al. | 429/13 |
| 6,566,003 B2 * | 5/2003 | Acker | 429/34 |
| 6,682,839 B2 * | 1/2004 | Wilkinson et al. | 429/24 |
| 2002/0122966 A1 * | 9/2002 | Acker et al. | 429/24 |
| 2003/0003336 A1 * | 1/2003 | Colbow et al. | 429/24 |

FOREIGN PATENT DOCUMENTS

| | | | |
|---|---|---|---|
| JP | 56-114284 A | * | 9/1981 |

OTHER PUBLICATIONS

"Fuel Cell", 1992 Fuel Cell Seminar, Program and Abstracts, pp. 233-236, 461-464.

"Miniaturized Fuel Cells for Portable Power", Helen L. Maynard and Jeremy P. Meyers, Lucent Technologies, 2000.

"Pocket-size PEMs", Paul Sharke, Mechanical Engineering.

"Polymer Electrolyte Fuel Cells as Potential Power Sources for Portable Electronic Devices", Shimshon Gottesfeld and Mahlon S. Wilson, pp. 486-517.

* cited by examiner

APPARATUS AND METHODS FOR GENERATING WATER IN A FUEL CELL SYSTEM

BACKGROUND OF THE INVENTION

1. Field of the Invention

The present invention relates generally to the field of fuel cells and, more specifically, to a direct methanol fuel cell system in which the need to store water in the system or fuel supply is minimized or eliminated through the provision of a water generator.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel-processing is complex, expensive and requires significant volume, reformer based systems are presently limited to comparatively high power applications.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically-conductive, but electronically non-conductive membrane (PCM). Typically, a catalyst which enables direct oxidation of the fuel on the anode is disposed on the surface of the PCM (or is otherwise present in the anode chamber of the fuel cell). Diffusion layers are typically in contact with each of the catalyzed anode and cathode faces of the PCM to facilitate the introduction of reactants and removal of products of the reaction from the PCM, and also serve to conduct electrons. Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol in an aqueous solution is used as fuel (the "fuel mixture"), and oxygen, preferably from ambient air, is used as the oxidizing agent. There are two fundamental half reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa).

Fuel cells and fuel cell systems have been the subject of intensified recent development because of their ability to efficiently convert the energy in carbonaceous fuels into electric power while emitting comparatively low levels of environmentally harmful substances. The adaptation of fuel cell systems to mobile uses, however, is not straight-forward because of the technical difficulties associated with reforming most carbonaceous fuels in a simple, cost effective manner, and within acceptable form factors and volume limits. Further, a safe and efficient storage means for substantially pure hydrogen (which is a gas under the relevant operating conditions), presents a challenge because hydrogen gas must be stored at high pressure and at cryogenic temperatures or in heavy adsorption matrices in order to achieve useful energy densities. It has been found, however, that a compact means for storing hydrogen is in a hydrogen rich compound with relatively weak chemical bonds, such as methanol or an aqueous methanol solution (and to some extent, ethanol, and other carbonaceous fluids or aqueous solutions thereof).

In particular, DMFCs are being developed for commercial production for use in portable electronic devices. Thus, the DMFC system, including the fuel cell, and the components may be fabricated using materials that not only optimize the electricity-generating reactions, but which are also cost effective, and allow the fuel cell system to fit demanding form factors. Furthermore, the manufacturing process associated with those materials should not be prohibitive in terms of labor intensity cost.

Typical DMFC systems include a fuel source, fluid and effluent management systems, and a direct methanol fuel cell ("fuel cell"). The fuel cell typically consists of a housing, and a membrane electrode assembly ("MEA") disposed within the housing.

A typical MEA includes a centrally disposed protonically conductive, electronically non-conductive membrane ("PCM"). One example of a commercially available PCM is Nafion® a registered trademark of E.I. Dupont de Nours and Company, a cation exchange membrane comprised of perfluorosulfonic acid, in a variety of thicknesses and equivalent weights. The PCM is typically coated on each face with an electrocatalyst such as platinum, or platinum/ruthenium mixtures or alloy particles. On either face of the catalyst coated PCM, the electrode assembly typically includes a diffusion layer. The diffusion layers function to evenly distribute the liquid fuel mixture across the catalyzed anode face of the PCM, or the gaseous oxygen from air or other source across the catalyzed cathode face of the PCM. In addition, flow field plates are often placed on the aspect of each diffusion layer that is not in contact with the catalyst-coated PCM. The flow field plates may function to provide mass transport of the reactants and by products of the electrochemical reactions and also have a current collection functionality to collect and conduct electrons through the load.

The direct oxidation fuel cell based on oxidation of methanol requires water and methanol to be present together at the anode catalyst in order for the oxidation half reaction of methanol to proceed to completion. However, in an energy conversion device based upon DMFC technology, for a given energy content, the size of the device is readily reduced by carrying only methanol in the fuel reservoir as opposed to a methanol-water solution. In some architectures, a portion of the water required will be present in the anode chamber, or may be recirculated from the cathode aspect of the DMFC, however, it may be necessary to generate additional water under some conditions. In other words, the volumetric energy density of the device can be maximized by reducing the amount of water stored in the methanol-water solution within the DMFC. This would require a method of water production within the device in order to drive the anodic half reaction to completion.

It is thus an object of the invention to provide a water generator that provides water for diluting the methanol supplied to the DMFC while increasing the volumetric energy returns of the fuel cell system over its lifetime.

SUMMARY OF THE INVENTION

In brief summary, the present invention provides a direct methanol fuel cell system in which water may be generated from methanol or other suitable fuel, thereby eliminating the need to store water, reducing the size of the fuel supply required to provide power, and increasing the energy yield by unit volume. In a preferred embodiment, the present invention uses a method of production of water based upon a catalytically facilitated reaction in which methanol is oxidized in the presence of oxygen to produce water, carbon dioxide and heat. Unlike the reaction that occurs in the direct oxidation fuel cells in which a fuel or fuel solution, water and oxygen are reacted in two separate half reactions, here oxygen reacts directly with the fuel or fuel solution in the presence of a suitable catalyst, producing water, carbon dioxide and some heat rather than electrical energy.

In the preferred embodiment, the reaction of carbonaceous fuel or fuel solution and oxygen to produce water, carbon dioxide and heat occurs spontaneously under relevant conditions, in the presence of a suitable catalyst, including, but not limited to platinum and platinum-ruthenium, without the need for external activation energy to be applied. Therefore, the only loss to the fuel cell system is the efficiency loss due to the oxidation of the fuel to generate water, rather than electricity.

A direct oxidation fuel cell ("DOFC") which uses the present invention may be configured such that a water generator is coupled to a flow path that connects the fuel source and anode chamber of the DOFC, or a flow path that connects the fuel source to the anode chamber, or is positioned along the path between the fuel source and the anode chamber. A pump, valve, or other passive means may be used to supply methanol to the water generator. In the embodiments summarized below, the carbonaceous fuel can be a pure fuel, a solution of fuel and water, or a mixture of fuels or fuel-water solutions.

The invention consists of a method of generating water for use within a direct oxidation fuel cell by introducing the fuel to a catalyzed surface or substrate within the direct oxidation fuel cell system in the presence of oxygen. This causes said fuel to be oxidized, resulting in the generation of water, allowing for the dilution of fuel within the fuel cell system and preventing said fuel from passing through the PCM without contributing to the electricity-generating reactions (fuel crossover).

In a first embodiment, the water generator may be provided by a material which is permeable to a carbonaceous fuel suitable for use in the fuel cell system, and treated on the outside surface with a catalyst (e.g. platinum or platinum-ruthenium) that activates the oxidation of fuel in the presence of oxygen. Preferably, the material of this embodiment is tubular and fluted in shape. In this embodiment, it is preferred that the carbonaceous fuel is introduced to the inside of a tube fabricated from the fuel-permeable, substantially gas-impermeable material. Some of the fuel permeates the material and reacts with oxygen on the catalyst on the outside of the tube, producing carbon dioxide, water and heat. At least one other portion of the tube fabricated from the fuel-permeable material may be left catalyst free so that water can diffuse back into the inside of the tube. Another aspect of this embodiment is to enclose the outside of the tube with a liquid-impermeable, gas-permeable material so that the carbon dioxide produced by the oxidation of the fuel may diffuse through the liquid-impermeable, gas-permeable material, leaving the space between the materials as a collection area for the water, or encouraging the water to be transported into the tube fabricated from the fuel-permeable, gas-impermeable material, by creating a pressure or concentration gradient between the liquid-impermeable, gas-permeable material and the tube.

In a second embodiment, the water generator may be provided by a gas-permeable, liquid-impermeable material. In the preferred embodiment, the gas-permeable liquid-impermeable material is in the shape of a fluted tube and coated on the inside surface with a catalyst capable of promoting oxidation of a carbonaceous fuel in the presence of oxygen. The carbonaceous fuel is introduced to the inside of the tube fashioned from the gas-permeable, liquid-impermeable material, and as air diffuses inside through the gas-permeable, liquid-impermeable material, the oxidation reaction occurs on the inside of the tube fashioned from the gas-permeable, liquid-impermeable material, producing water, carbon dioxide and heat. A portion of the material is left uncatalyzed so that excess air and carbon dioxide may diffuse to the outside of the tube resulting in liquid water being collected, substantially gas free, on the inside of the gas-permeable, liquid-impermeable material. Those skilled in the art will recognize that the materials described herein for the purpose of transporting liquids or gases may consist of formed membranes, extruded materials, or using other methods well known to those skilled in the art.

In a third embodiment, the water generator is a membrane electrode assembly (MEA) configured for direct oxidation of a carbonaceous fuel, where electricity generated can be harnessed and delivered to the application, and in which the MEA can also be used to generate water for use within the fuel cell system. When water generation is desired, oxygen is used to directly oxidize the carbonaceous fuel in the presence of a catalyst found at the anode of the MEA, producing carbon dioxide, heat and water.

There are several key benefits of this invention. The first is that the fuel solution (e.g. methanol or an aqueous methanol solution) can be quickly diluted by adding water to the fuel mixture prior to the introduction of fuel into the anode chamber, or adding water into the fuel mixture, thus minimizing fuel crossover. Losses due to the generation of water by intentionally oxidizing fuel, will be less than the losses due to the fuel cross-over. Secondly, this invention minimizes or eliminates the need to carry a dilute, and therefore more voluminous, fuel mixture into the fuel cell system. This makes more efficient use of the volume of the fuel cell, as well as providing the ability to carry a fuel supply that is more concentrated than is presently practical. Thirdly, eliminating the need to carry water may simplify the system design by providing a system with fewer conduits and fluidic connections. This may simplify manufacturing as well. In addition, because the chemical conversion to water is relatively efficient, the concentration of the fuel can be easily controlled by controlling the amount of fuel that is oxidized for the purpose of generating water. Those skilled in the art will also recognize that the reactions create heat, which may also be useful from time to time.

Those skilled in the art will recognize that this invention may be implemented in fuel cell systems consisting of one or more fuel cells, including systems where a plurality of cells are "stacked" in order to meet the power profiles of the application to which electricity is being supplied.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
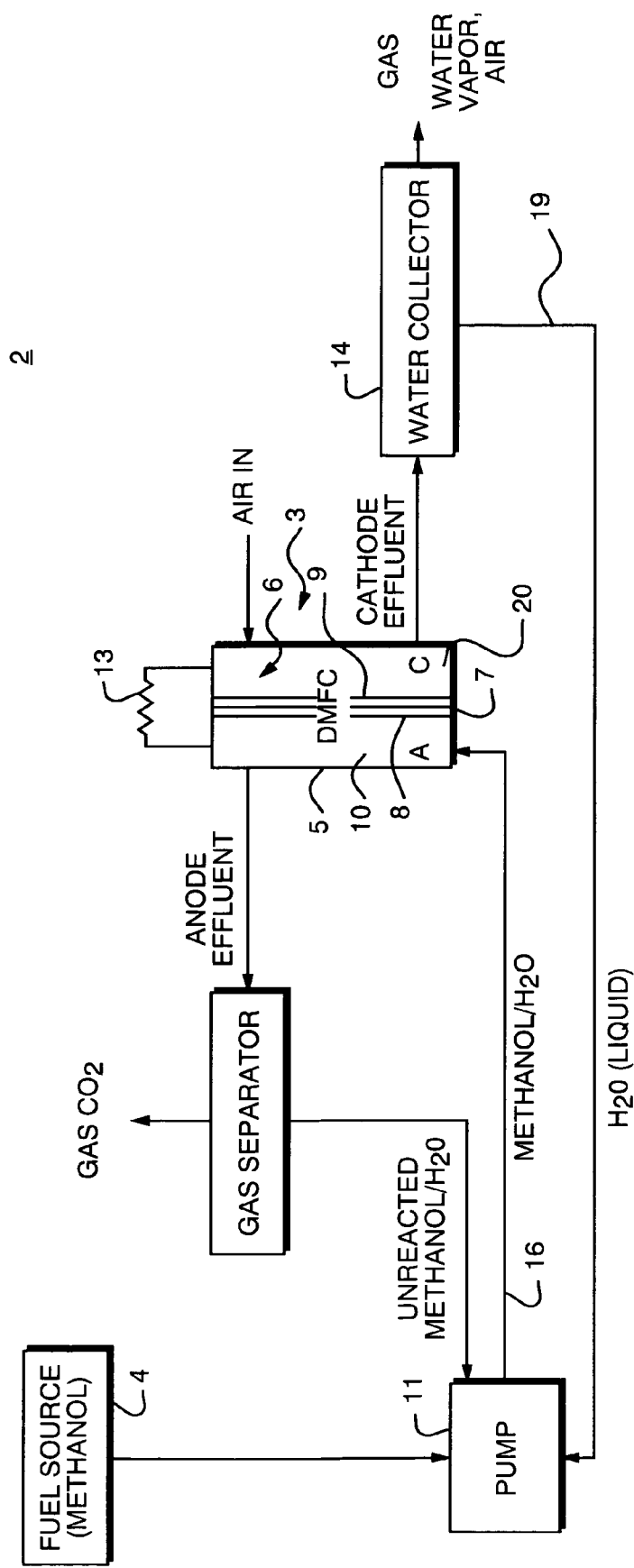
FIG. 1 is a block diagram of a direct fuel cell system known in the prior art.

A direct oxidation fuel system 2 is schematically illustrated in FIG. 1. The fuel cell system 2 includes a direct oxidation fuel cell, which may be a direct methanol fuel cell 3 ("DMFC"), for example. For purposes of illustration we herein describe an illustrative embodiment of the invention with DMFC 3, or DMFC system with the fuel substance being methanol or an aqueous methanol solution. It should be understood, however, that it is within the scope of the present invention that other fuels such as ethanol, or combinations thereof and aqueous solutions thereof, and other carbonaceous fuels amenable to use in DMFC systems may be used. It should be further understood that the invention is applicable to any fuel cell system where it is preferable to introduce water to the reactants in order to facilitate the operation of the fuel cell system, and not simply those that are similar to those set forth in FIG. 1.

The system 2, including the DMFC 3, has a fuel delivery system to deliver fuel from fuel source 4. The DMFC 3 includes a housing 5 that encloses a membrane electrode assembly 6 (MEA). MEA 6 incorporates protonically conductive, electronically non-conductive, membrane (PCM) 7. PCM 7 has an anode face 8 and cathode face 9, each of which may be coated with a catalyst, including but not limited to platinum or a blend of platinum and ruthenium. Diffusion layers are typically provided and in intimate contact with the catalyzed faces of each of the anode and cathode aspects of the PCM, though the invention is not limited to systems that require diffusion layers. The portion of DMFC 3 defined by the housing 5 and the anode face of the PCM is referred to herein as the anode chamber 10. The portion of DMFC 3 defined by the housing 5 and the cathode face of the PCM 7 is referred to herein as the cathode chamber 20. Those skilled in the art will recognize that the catalyst may be applied to the PCM by applying a suspension containing the catalyst to PCM. As used herein the terms "anode face" and "cathode face" may refer to the catalyzed faces of the PCM, and shall include any residual catalyst materials that may remain on the surface of the PCM as the result of such application.

As will be understood by those skilled in the art, electricity-generating reactions occur when a fuel substance is introduced to the anode face 8, and oxygen, usually in the form of ambient air, is introduced to the cathode face 9. More specifically, a carbonaceous fuel substance from fuel source 4 is delivered by pump 11 to the anode chamber 10 of the DMFC 3. The fuel mixture passes through channels in the flow field plate, and/or a diffusion layer, and is ultimately presented to the anode face of the PCM 8. Catalysts on the membrane surface (or which are otherwise present within the MEA) enable the anodic oxidation of the carbonaceous fuel on the anode face 8, separating hydrogen protons and electrons from the fuel and water molecules of the fuel mixture. Upon the closing of a circuit, protons pass through PCM 7, which is impermeable to the electrons. The electrons thus seek a different path to reunite with the protons, and travel through a load 13 of an external circuit, thus providing electrical power to the load. So long as the reactions continue, a current is maintained through the external circuit. Direct oxidation fuel cells produce water ($H_2O$) and carbon dioxide ($CO_2$) as byproducts of the reaction. The water collector 14 acts as a storage unit for water produced. This water can be later directed to the pump 11 via a flow path 19.

Figure 2:
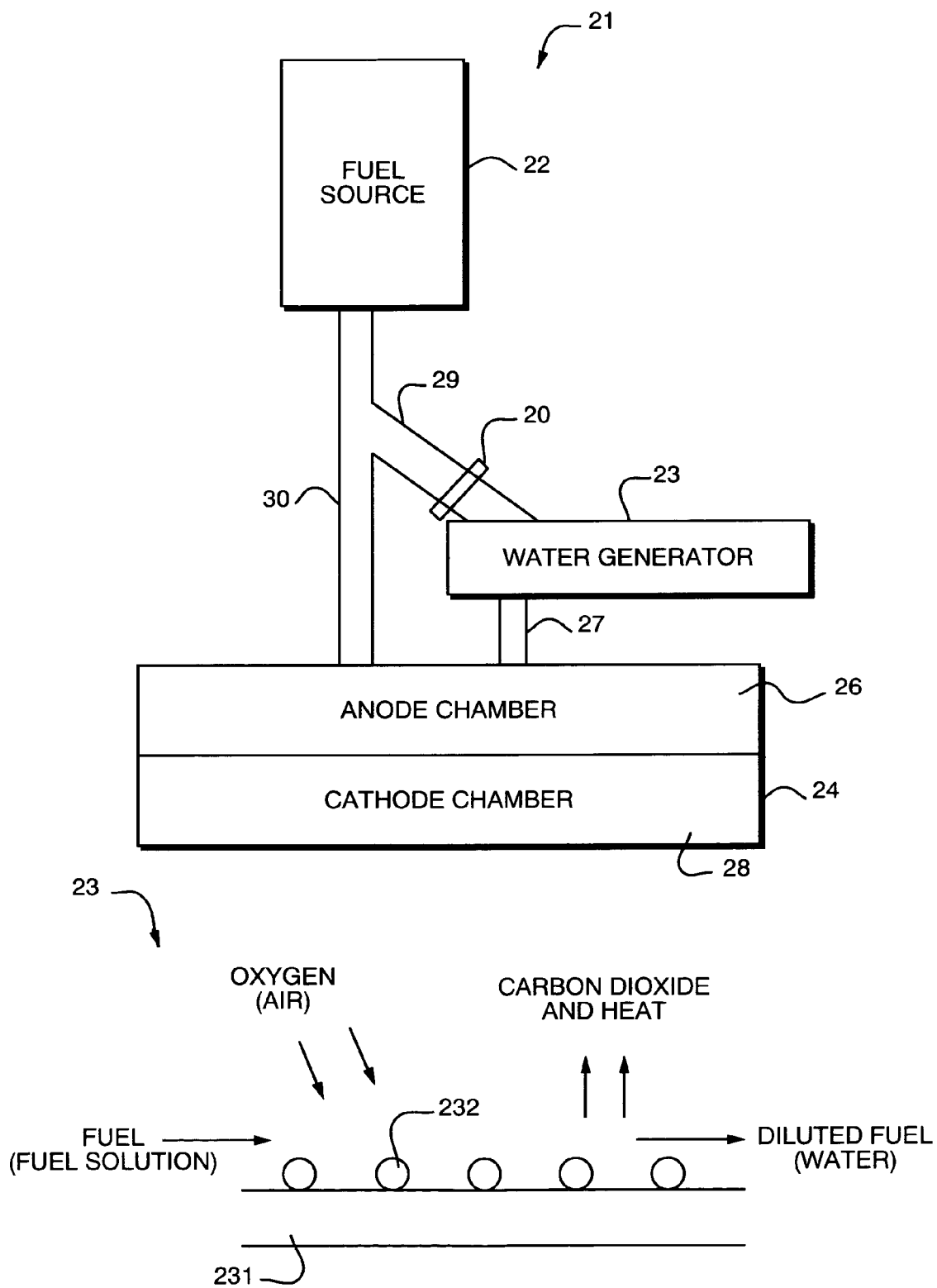
FIG. 2 is a block diagram of a direct oxidation fuel cell with an attached water generator constructed in accordance with a preferred embodiment of the present invention.

FIG. 2 illustrates a direct oxidation fuel cell 24 and a water generator 23, which, in a preferred embodiment, can be implemented with a DMFC system 21. Water generator 23 is coupled to anode chamber 26 by a conduit 27. Conduits 29 and 30 couple a fuel source 22 to water generator 23 and anode chamber 26, respectively. Operation of the water generator 23 is controlled by the operation of valve 20, which manages the flow of fuel or fuel solution into the water generator 23. The detailed construction of various preferred embodiments of the water generator 23 may be understood with reference to FIGS. 3-6.

Water generator 23 is comprised of at least one substrate or surface 231 that is treated with a catalyst 232. Said substrate 231 does not react with, or interfere with the catalytic oxidation of methanol, or other appropriate fuel, in the presence of oxygen, and does not react with the fuel or products of said oxidation. Said surface 231 may be disposed within a housing (not shown), which may, but need not, have valves or other components (not shown) that control the introduction of fuel and air, as well as the distribution of catalytically generated water and carbon dioxide.

Figure 3:
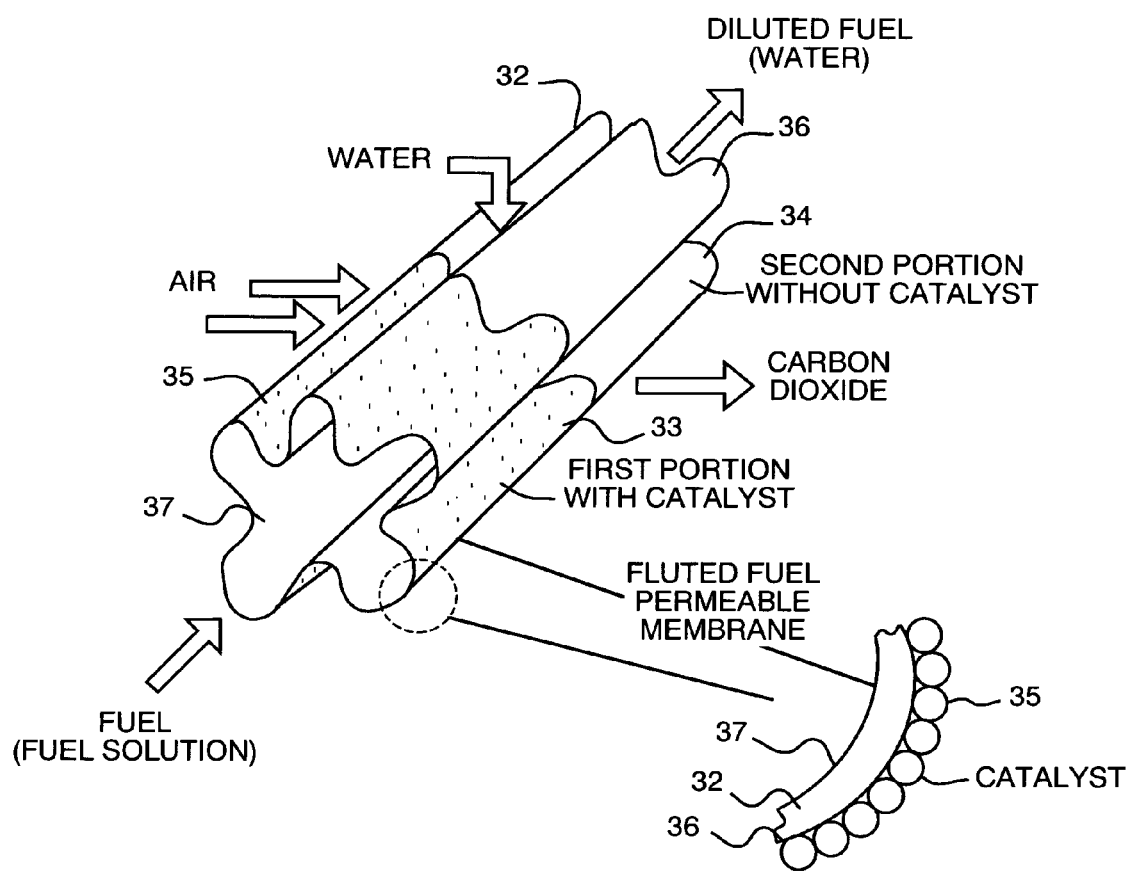
FIG. 3 is a perspective of a first embodiment of a water generator of the type shown in FIG. 2.

With reference to FIG. 3, a fuel-permeable, substantially gas-impermeable material 32, including but not limited to uncatalyzed Nafion®, is provided in the shape of a tube. The tube is preferably, but does not need to be, in a fluted configuration to provide greater surface area for the catalytic oxidation of the fuel. A first portion 33 of the outer surface 36 of the fuel-permeable, substantially gas-impermeable material 32 is treated with a catalyst 35 capable of promoting the oxidation of the fuel or fuel solution in the presence of air, including, but not limited to platinum or a blend of platinum and ruthenium. In the preferred embodiment, the catalyst is applied to at least one portion of the outer surface 36 of the fuel-permeable, substantially gas-impermeable material 32. At least one other portion of the fuel-permeable, substantially gas-impermeable material 32 remains uncatalyzed, such as portion 34. In this embodiment, the fuel or fuel solution is introduced to the inside of the fuel-permeable, substantially gas-impermeable material 32 at one end 37. Some of the fuel permeates the fuel-permeable, substantially gas-impermeable material 32 to the outer surface 36. Oxygen, preferably from ambient air present on the outside of the fuel-permeable, substantially gas-impermeable material 32, or which is otherwise provided access to the catalyst, then reacts with fuel or fuel solution in the presence of the catalyst 35 producing carbon dioxide, water and heat. Water or a dilute fuel solution may diffuse back into fuel-permeable, substantially gas-impermeable material 32 through the uncatalyzed portion 34, and to a lesser extent through the portion that has been treated with catalyst. Those skilled in the art will recognize that the materials described herein for the construction of the water generator may consist of formed membranes, extruded materials, or other means well known to those skilled in the art.

Figure 4:
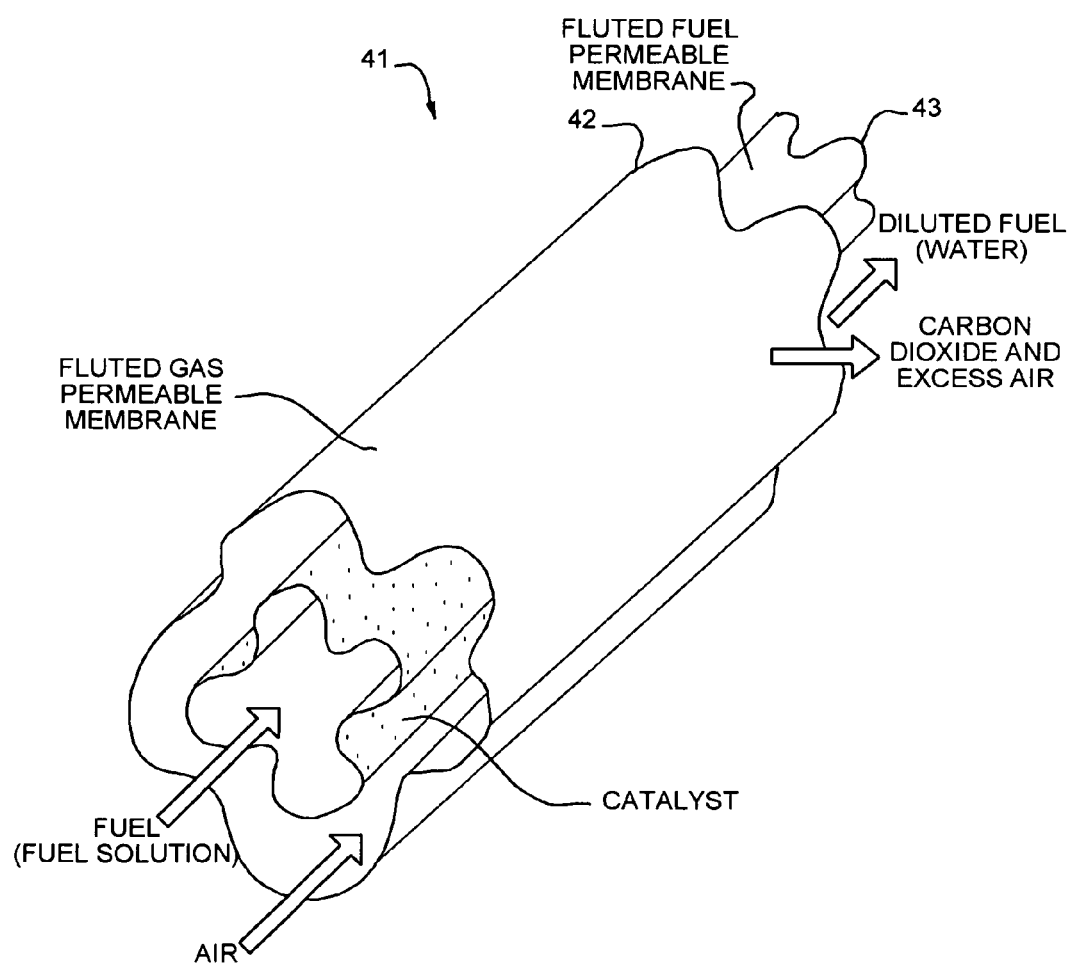
FIG. 4 is a perspective of the water generator of FIG. 3 with a gas-permeable material enclosing the material permeable by a desired carbonaceous fuel.

FIG. 4 shows an alternative embodiment of the water generator 23 (see FIG. 2). A gas-permeable, liquid-impermeable membrane 42 fabricated from appropriate materials, including, but not limited to expanded PTFE available from Zeus Inc. and other commercial manufacturers, encloses a fuel-permeable, gas-impermeable material 43, which has been treated with catalyst, and which is similar in construction to the embodiment shown in FIG. 3. As a result, any generated water remains on the inside of gas-permeable, liquid-impermeable material 42, and may diffuse back into the fuel or fuel solution passing through gas-impermeable, liquid-permeable material 43. Gas-permeable, liquid-impermeable material 42 is preferably fabricated from a highly hydrophobic material that is either in intimate contact with or that creates a very small volume between gas-permeable, liquid-impermeable material 42 and the fuel-permeable, gas-impermeable material 43. Such fabrication will create a pressure or gradient to drive water or a diluted fuel solution back into the conduit formed by fuel-permeable, gas-impermeable material 43, thus diluting the fuel mixture being delivered from the water generator to the anode chamber.

Alternatively, water or a dilute fuel solution may remain outside of the fuel-permeable substantially gas-impermeable material 43, and be collected at the end of the conduits formed by materials 42 and 43. Excess air and carbon dioxide permeate the gas-permeable, liquid-impermeable material 42 and are vented to the ambient environment or used within the fuel cell system to perform work including, but not limited to, driving a pump prior to being vented from the system. Those skilled in the art will recognize that it may be necessary to implement a gas/liquid separator (not shown) between the water generator 41 and the anode chamber 26 (see FIG. 2). The gas/liquid separator is preferably disposed between the water generator 23 (see FIG. 2) and the anode chamber 26 (see FIG. 2) or conduit 27, (see FIG. 2) into which water is to be introduced, in order to effectively separate the generated carbon dioxide and any remaining oxygen from the liquid mixture being passed through water generator 41. Such disposition of the gas/liquid separator (not shown) also allows the fuel to be introduced to the anode chamber 26 (see FIG. 2) without introducing oxygen into the cathode chamber 28 (see FIG. 2) of the direct oxidation fuel cell 24 (see FIG. 2).

Figure 5:
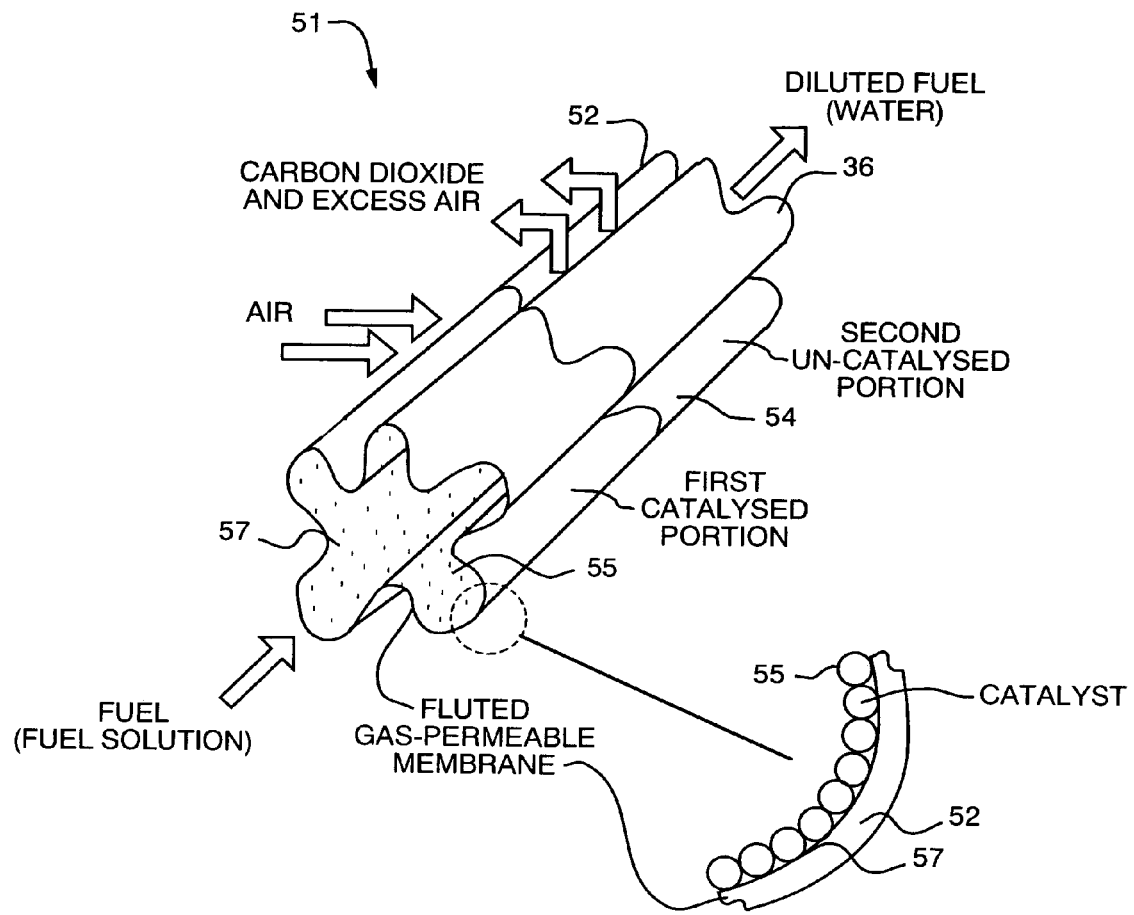
FIG. 5 is a perspective of a second embodiment of a water generator of the type shown in FIG. 2.

FIG. 5 shows a second embodiment of the invention in which a water generator 51 includes a gas-permeable, liquid-impermeable material 52 in a tubular shape. The tube is preferably, but does not need to be, in a fluted configuration. In this embodiment, a catalyst 55 has been applied to the inner surface 57 of the gas-permeable, liquid-impermeable material 52. The fuel or fuel solution is introduced to the inside of the gas-permeable, liquid-impermeable material 52 at one end. Air permeates the gas-permeable, liquid-impermeable material 52 to the inner surface of the material 57. Oxygen that is available on the inner surface 57 of the material then reacts with fuel in the presence of the catalyst 55, to produce carbon dioxide, water and heat. At least one other portion 54 of the gas-permeable, liquid-impermeable material 52 is left uncatalyzed so that excess air and carbon dioxide may be vented from the inside of the gas-permeable, liquid-impermeable material 52. As a result, water or a diluted fuel solution is collected gas free from the end of the gas-permeable, liquid-impermeable material 52 opposite the end where fuel was introduced. Those skilled in the art will recognize that it may be preferable to include a plug (not shown), or otherwise restrict the flow of the water or dilute fuel mixture in order to generate sufficient backpressure to encourage gases present in said water generator to be removed prior to entering the anode chamber 26 (see FIG. 2) of the fuel cell 24 (see FIG. 2).

Figure 6:
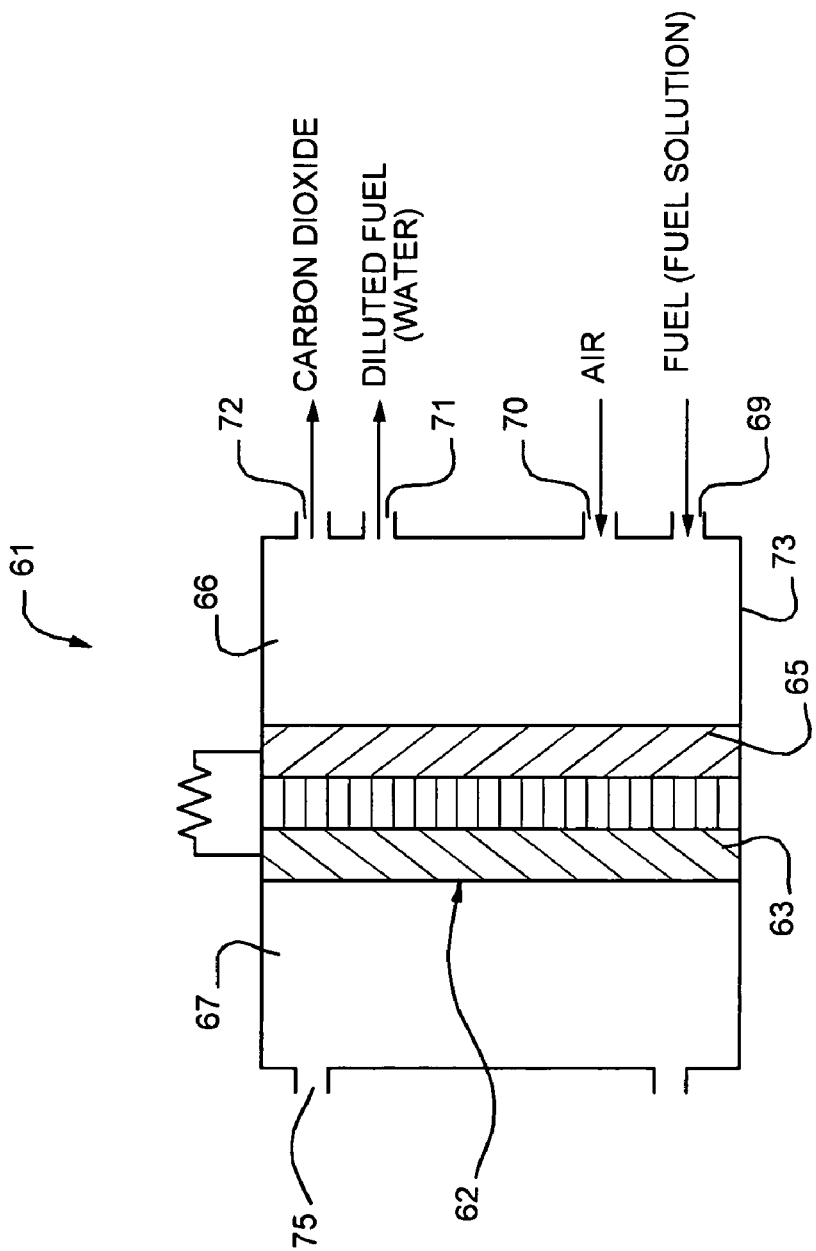
FIG. 6 is a perspective of a third embodiment of a water generator of the type shown in FIG. 2.

FIG. 6 shows a third embodiment of the present invention in which a water generator/DMFC 61 includes a membrane electrode assembly 62 (MEA) configured for direct fuel oxidation and power generation. For purposes of illustration, and not by way of limitation, water generator/direct oxidation fuel cell 61, shall be referred to as "water generator/DMFC" herein. The MEA is enclosed in a housing 73 forming an anode chamber 66 between housing 73 and anode aspect of the PCM 65, and a cathode chamber 67 between the housing 73 and the cathode aspect of the PCM 63. Water generator/DMFC 61 may be substituted for water generator 23 (see FIG. 2). In a first operation mode, where no electricity is generated, air and fuel or fuel solution are introduced into the anode compartment 66 via openings 69 and 70 respectively. A catalyst that promotes the oxidation of fuel has been applied to the anode face of PCM, and thus the fuel is oxidized completely (i.e. into water and carbon dioxide) when introduced to the anode chamber 66 in the presence of oxygen. Carbon dioxide exits the housing 75 via opening 72, and is removed from the system while water or dilute fuel leaves via opening 71 and is introduced to the anode chamber of a fuel cell. In the second operation mode, oxygen is prevented from entering the anode chamber 66, and water is generated on the catalyzed cathode aspect of the PCM 63. As such, the water generator/DMFC 61 functions essentially as a conventional direct methanol fuel cell and produces electricity, which may be used to support a load within the application to which electricity is being provided. Said water generator/DMFC 61 can be used to generate water by: 1) introducing excess fuel (in proportion to the demand of the attached load) to a DMFC of standard design and materials; or 2) introducing fuel to a to water generator/DMFC 61t without a load being connected between the anode and cathode aspects of the water generator/DMFC 61. By doing so, fuel crossover is promoted, and fuel that passes through the PCM is oxidized without generating electricity, thus forming additional water in the cathode chamber 67 of the water generator/DMFC 61. It may be further possible to intentionally vary said load attached to water generator/DMFC 61 periodically in order to periodically induce fuel crossover, and resulting generation of water. Said additional water may be transported within the system (21 of FIG. 2) as necessary.

Figure 7:
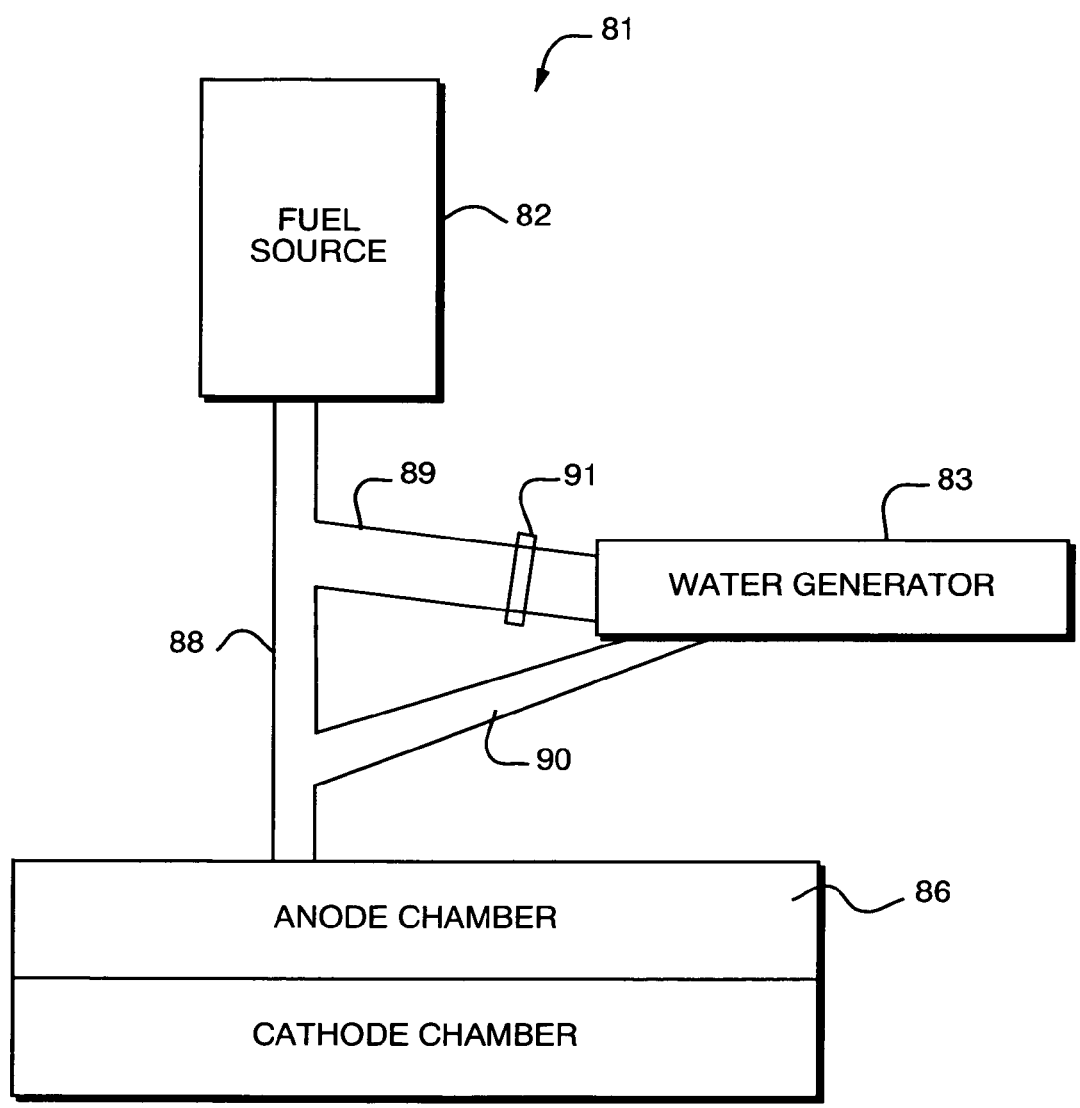
FIG. 7 is a block diagram of an alternative embodiment of a direct oxidation fuel cell with an attached water generator, which may use any of the water generators of FIGS. 3-6.

FIG. 7 illustrates an alternative embodiment of a direct fuel cell attached to a water generator 83 and a fuel (fuel solution) source 82. The water generator 83 is coupled to conduit 88, by conduits 89 and 90. Conduit 88 couples the fuel source 82 to the anode chamber 86. Operation of the water generator 83 is controlled by the operation of valve 91, which manages the flow of fuel or fuel solution into the water generator 83 on conduit 89. This is alternative embodiment to that shown in FIG. 2, which may also use any of the water generators of FIGS. 3-6.

Figure 8:
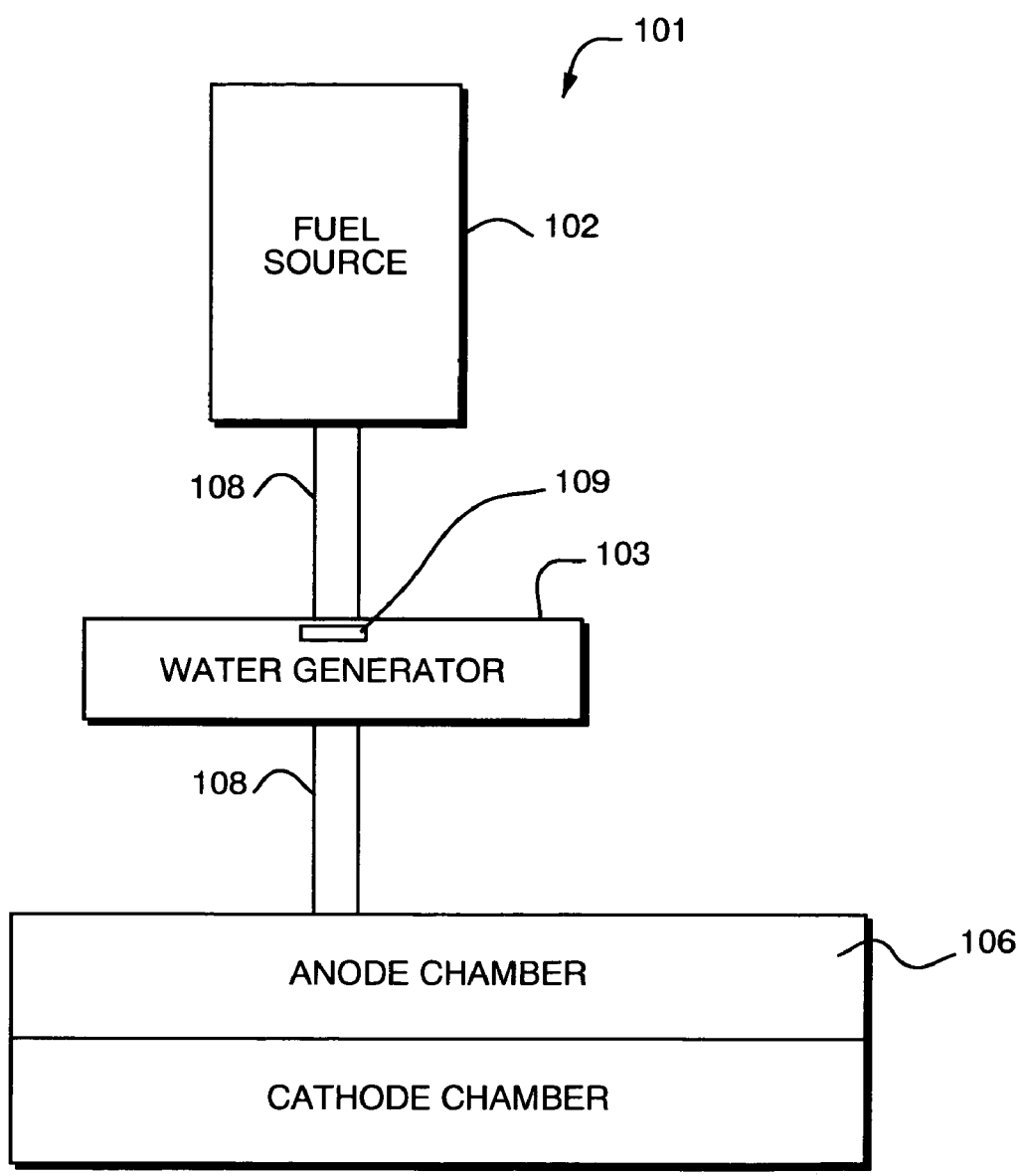
FIG. 8 is a block diagram of a second alternative embodiment of a direct oxidation fuel cell with an attached water generator, which may use any of the water generators of FIGS. 3-6.

FIG. 8 illustrates a direct oxidation fuel cell attached to a water generator 103 situated along a conduit 108 that couples an anode chamber 106 to a fuel (fuel solution) source 102.

Operation of the water generator 103 is controlled by the operation of valve 109, which manages the flow of fuel or fuel solution through the water generator 103. This is a second alternative embodiment to that of FIG. 2, which may also use any of the water generators of FIGS. 3-6. Those skilled in the art will recognize that it is possible, and it may be preferable to store any water generated temporarily, and introduce said water to the fuel mixture at a later time.

FIGS. 3-6 show embodiments of a water generator that uses a fluted tubular membrane selectively coated or not coated with a catalyst. This is illustrative of preferred embodiments. Those skilled in the art will recognize that one can substitute other carbonaceous fuels for methanol and aqueous solutions thereof, and use other catalysts and catalyst mixtures instead of platinum or platinum-ruthenium mixtures, which may more actively promote the direct oxidation of carbonaceous fuels in the presence of oxygen. Those skilled in the art will further recognize that any water generated using the methods or apparatuses set forth herein can be distributed to more than one fuel cell, and still remain within the intent and scope of the invention. It will obvious to those skilled in the art that surfaces other than those described herein may be used as a substrate in these reactions, and that water can be generated using apparatuses that are of different configurations than those set forth herein, while remaining within the scope of the invention.

What is claimed is:

1. A method of employing a direct oxidation fuel cell system as a combined power generator, and water generator, comprising:
   (A) providing a housing;
   (B) providing a source of fuel in fluid communication with said housing;
   (C) providing a source of oxygen in fluid communication with said housing;
   (D) providing a membrane electrode assembly having a catalyzed membrane electrolyte, with an anode aspect and a cathode aspect, disposed within said housing, an anode chamber being defined between said anode aspect of the catalyzed membrane electrolyte and a first exterior portion of said housing, and a cathode chamber being defined between said cathode aspect of the catalyzed membrane electrolyte and a second exterior portion of said housing; and
   (E) providing a first opening being an air inlet for the introduction of oxygen into the anode chamber;
   (F) providing a second opening being a separate fuel inlet for the introduction of fuel into said anode chamber;
   (G) detachably connecting a load across said membrane electrode assembly; and
   (H) introducing fuel and oxygen into said anode chamber to oxidize said fuel to produce water, and detaching said load such that the system produces no electricity.

2. The method of employing a direct oxidation fuel cell sys-tem as a combined power generator, and water generator as defined in claim 1 further comprising:
   preventing the introduction of oxygen into the anode chamber; and
   allowing the introduction of fuel into said anode chamber, while not connecting said load across said membrane electrode assembly, such that fuel is added to said anode chamber to induce fuel cross over and to generate water in said cathode chamber.

\* \* \* \* \*